United States Patent Office 3,438,963
Patented Apr. 15, 1969

3,438,963
ALKYLATION PROCESS FOR CATIONIC TRIAZOLE DYE
Woodrow Wilson Robbins, Plainfield, N.J., assignor to American Cyanamid Company, Stamford, Conn., a corporation of Maine
No Drawing. Filed Feb. 7, 1966, Ser. No. 525,340
Int. Cl. C09b 5/30
U.S. Cl. 260—157     3 Claims

ABSTRACT OF THE DISCLOSURE

Cationic triazole dyes are prepared from triazole dye bases by a process which involves reacting the dye base with an alkali metal hydroxide or alcoholate in the presence of a solvent to form an alkali metal salt of the dye base in the solvent, removing substantially all water present in the solvent solution, adding to said solution an alkylating agent, such as an alkyl halide, maintaining the temperature of the solution at from 5 to 60° C. for from 0.5 to 4 hours, then raising the temperature to between about 60° C. and 85° C. and maintaining this temperature for from 5 to 15 hours, whereby the quaternized, cationic dye product is formed.

---

This invention relates generally to an alkylation process for making cationic triazole dyes and more particularly, the invention relates to a process for alkylating and quaternizing azo triazole dye bases, commonly known in the art as acrylic dyes.

In preparation of dyes of the class contemplated by the invention, the triazole dye bases must be converted to the cationic triazole dyes by the steps of alkylation and quaternization. The prior processes known in the art for carrying out these steps have been found to be unsatisfactory. The desired dyes are obtained in low yield and are contaminated by tars and isomeric products which make purification steps necessary. The result is that the desired dyes are costly and the processes are uneconomical and impractical on a commercial scale. Other processes, while giving better results, require a large number of process steps which in turn involve isolation of intermediates and other tedious operations. The end result is again a costly product. All these disadvantages are avoided by employing the process of this invention.

The invention is a process for the manufacture of dyes of the formula

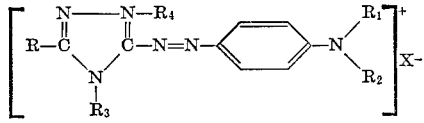

wherein R is a hydrogen atom or an alkyl, cycloalkyl, aryl or heterocyclic radical; $R_1$ and $R_2$ are either identical or different and may be aliphatic radicals, benzyl, phenyl or radicals wherein $R_1$ or $R_2$ taken together with the amino nitrogen form a heterocyclic ring; $R_3$ and $R_4$ are lower alkyl radicals; and $X^-$ is an anion; and the ring systems can be further substituted by substituents such as alkyl, alkoxy, aralkyl, aryl, nitro, acylamino, halogen, sulfonic acid amide, alkyl sulfonyl, carboxylic acid ester, and the like.

In preparing the cationic dyes, triazole dye bases having the formula shown below are alkylated and quaternized under specific reaction conditions.

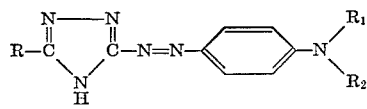

The azo triazole dye bases of the above formula can be prepared by known methods as, for example, those shown in U.S. Patent No. 2,883,373. Generally a 3-amino-1,2,4-triazole is diazotized and coupled with an N,N'-di-substituted aniline.

The triazoles which can be used as the diazo compound include, for example, 3-amino-1,2,4-triazole,
3-amino-5-methyl-1,2,4-triazole,
3-amino-5-ethyl-1,2,4-triazole,
3-amino-5-phenyl-1,2,4-triazole,
3-amino-5-(p-nitrophenyl)-1,2,4-triazole,
3-amino-5-m-tolyl-1,2,4-triazole,
3-amino-5-cyclohexyl-1,2,4-triazole,
3-amino-5-(2-thienyl)-1,2,4-triazole, and so forth.

The N,N-substituted anilines which can be used as the coupling component include, for example, N,N-dimethylaniline,
N,N-diethylaniline,
N,N-bis(beta-hydroxyethyl)-aniline,
N-ethyl-N-benzylaniline,
N,N-dibenzylaniline,
N,N-diphenylaniline,
N,N-dimethyl-3-chloroaniline,
N,N-dimethyl-3-methylaniline,
N,N-dimethyl-3-methoxyaniline,
N,N-dimethyl-3-carbethoxyaniline,
N-methyl-N-beta-cyanoethylaniline,
N,N-dimethyl-2, 5-dimethoxybenzene,
N-methyl-N-phenylaniline,
N-phenylmorpholine, and so forth.

It has been discovered that the azo triazole dye bases which are the products of this invention can be converted to the corresponding triazole cationic dyes by a straight forward procedure which involves no separate steps of isolating intermediates (i.e., it is an in situ operation) and the desired dyes of excellent quality are obtained as the final products in very good yield and purity. The improved process avoiding isolation of intermediates makes available the triazole cationic dyes of the hereinabove formula in a practical and economical manner.

The process of this invention can be described generally by the steps of converting an azo triazole dye base in an organic solvent medium to an alkali metal salt. The salt forming reaction is possible because there is an acidic nitrogen-based hydrogen on the triazole ring in the dye base. The alkali metal salt of the triazole dye base is then reacted in the same organic solvent medium (i.e., there is no isolation step) with a suitable alkylating and quaternizing agent under essentially anhydrous conditions and under controlled conditions of time and temperature. The resulting triazole cationic dye is then isolated by adding water, separating an aqueous solution of the dye and precipitating and recovering the dye from the aqueous solution by conventional methods. Operating in this manner, the reaction with the alkylating and quaternizing agent is carried out in the absence of water.

The organic solvents useful in the process of this invention include, for example, higher boiling aliphatic, cycloaliphatic and aromatic hydrocarbons such as heptane, the octanes, heavy hydrocarbon fractions, benzene, toluene, the xylenes, and the like; also aromatic halogenated and other substituted hydrocarbons, such as mon- and dichlorobenzenes, nitrobenzene, and the like.

The triazole dye base contained in the solvent medium is converted to an alkali metal salt by adding a suitable strongly alkaline, alkali metal compound, such as an alkali metal lower alcoholate or alkali metal hydroxide, for example, sodium methylate, sodium ethylate, potassium methylate, sodium hydroxide, potassium hydroxide, lithium hydroxide, mixtures of the foregoing, and the like. A sufficient amount of the alkali metal compound is used to convert the triazole dye base completely to the alkali metal salt, in other words, at least a stoichiometric amount is used. A lower alcohol such as methanol is also advantageously added to expedite the salt formation. In one preferred procedure methanol and sodium methylate are added to the mixture of dye base and solvent and the mixture is heated while distilling off the methanol until a temperature of about 120° C. is reached. At this point, salt formation is substantially complete. If the alkali metal salt is formed using an aqueous alkali metal hydroxide solution, or if water is a product of whatever agent is used in reaction with the acidic hydrogen of the base, then, before proceeding with the quaternization step, the water content of the system must be decreased until essentially anhydrous conditions exist using suitable dehydrating methods such as distillation, use of water absorbent, etc.

The alkylating and quaternizing agents of choice are esters of strong mineral acids or organic sulfonic acids and, preferably, lower alcohols. They include di-lower alkyl sulfates, lower alkyl halides, such as alkyl chlorides, alkyl bromides, and alkyl iodides and lower alkyl esters of monocyclic aryl sulfonic acids. Examples include dimethyl sulfate, diethyl sulfate, methyl chloride, ethyl bromide, methyl iodide, methyl benzenesulfonate, ethyl p-toluenesulfonate, propyl p-chlorobenzenesulfonate, and the like.

Sufficient alkylating and quaternizing agent is used to introduce alkyl groups at positions 2 and 4 of the triazole ring and as otherwise may be required. This results in alkylation of the nitrogen at position 4 and quaternization of the nitrogen at position 2. In the case of a dialkyl sulfate, the theoretical amount is used. By theory, two equivalents of the alkylation and quaternizing agent are required.

The reaction between the alkali metal salt of the triazole dye base and the alkylating agent is carried out under carefully controlled conditions. The temperature of the reaction mixture is maintained between 5° and 60° C., preferably, between 20° and 40° C. for between 0.5 hour and 4 hours. The temperature of the reaction mixture is then raised to between 60° and 85° C., preferably, between 65° and 75° C. The temperature is maintained for between 5 hours and 15 hours, or until the quaternization is essentially completed.

The quaternized cationic triazole dyes can be isolated by any conventional process, but is most convenient in this process to add sufficient water to the reaction mixture to dissolve the quaternized dye and, after sufficient stirring period, to allow the two phase mixture to separate into two layers. The aqueous layer containing the dye is removed and the dye is isolated by conventional salting out operation followed by filtration, washing and drying operations.

The following examples are intended to be illustrative only and it is in no way intended to limit the scope of the invention thereto. The parts and percentages are all by weight unless otherwise stated.

EXAMPLE 1

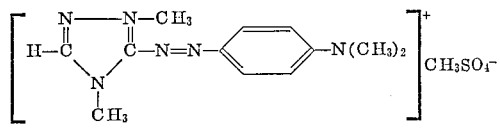

A mixture of 2,300 parts of chlorobenzene and 139 parts of 3-(4-dimethylaminophenylazo) - 1,2,4 - triazole, prepared by coupling the diazotized 3-aminotriazole with N,N-dimethylaniline, is stirred and distilled to remove any water that may be present. After cooling to about 40° C., 500 parts of methanol and 140 parts of methanolic solution of sodium methylate containing 35 parts of sodium methylate are added. The reaction mixture is heated and the methanol is removed by distillation. The mixture is cooled to 25° C. and 163 parts of dimethyl sulfate is added. The reaction mixture is stirred at 30° C. for 4 hours and then at 70° C. for 5 hours. After cooling to 30° C., 1,500 parts of water is added. The mixture is stirred and after a settling period, the chlorobenzene is separated by decantation. The separated chlorobenzene can be used for the next batch if desired. To the aqueous portion 1,000 parts of water and 105 parts of 37% hydrochloric acid are added followed by 1,050 parts of salt. The dye crystals are separated by filtration, washed with 30% salt solution and dried.

EXAMPLE 2

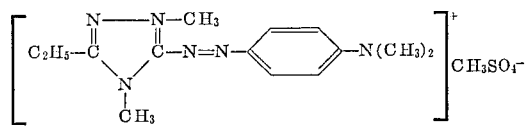

The procedure of Example 1 is repeated, substituting 157 parts of 3 - (4 - dimethylaminoazo) - 5-ethyl-1,2,4-triazole, prepared by coupling the diazotized 3-amino-5-ethyl-1,2,4-triazole with N,N-dimethylaniline, for the 139 parts of 3-(4-dimethylaminophenylazo)-1,2,4-triazole.

EXAMPLE 3

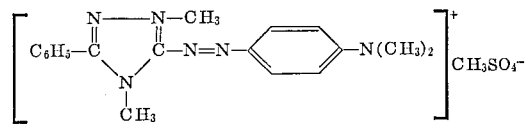

The procedure of Example 1 is repeated substituting 188 parts of 3 - (4-dimethylaminophenylazo)-5-phenyl-1,2,4-triazole, prepared by coupling the diazotized 3-amino-5-phenyl-1,2,4-triazole with N,N - dimethylaniline, for the 139 parts of 3-(4-dimethylaminophenylazo)-1,2,4-triazole.

EXAMPLE 4

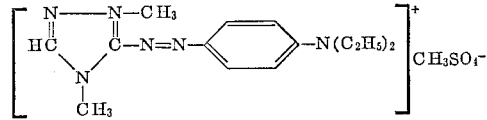

The procedure of Example 1 is repeated substituting 158 parts of 3-(4-diethylaminophenylazo)-1,2,4-triazole, prepared by coupling the diazotized 3-amino-1,2,4-triazole with N,N-diethylaniline, for the 139 parts of 3-(4-dimethylaminophenylazo)-1,2,4-triazole.

EXAMPLE 5

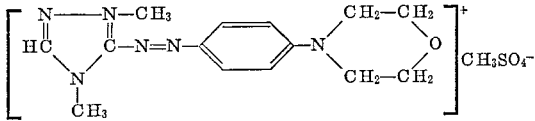

The procedure of Example 1 is repeated substituting 166.5 parts of 3-(4-morpholinophenylazo)-1,2,4-triazole, prepared by coupling the diazotized 3-amino-1,2,4-triazole with N-phenylmorpholine, for the 139 parts of 3-(4-dimethylaminophenylazo)-1,2,4-triazole.

EXAMPLE 6

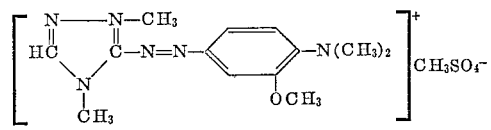

The procedure of Example 1 is repeated substituting 158.5 parts of 3-(4-dimethylamino-3-methoxyphenylazo)-1,2,4-triazole, prepared by coupling the diazotized 3-amino-1,2,4-triazole with N,N-dimethyl-2-methoxyaniline, for the 139 pars of 3-(4-dimethylaminophenylazo)-1,2,4-triazole.

EXAMPLE 7

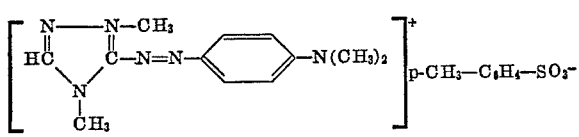

The procedure of Example 1 is repeated substituting 360 parts of methyl p-toluenesulfonate for the 163 parts of dimethyl sulfate.

EXAMPLE 8

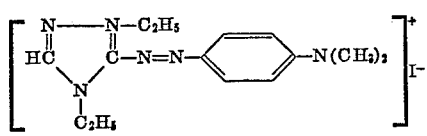

The procedure of Example 1 is repeated substituting 203 parts of ethyl iodide for the 163 parts of dimethyl sulfate.

EXAMPLE 9

The procedure of Example 1 is repeated substituting 36 parts of potassium hydroxide for the 35 parts of sodium methylate. Before quaternizing, the water formed in the system is removed by distilling the water out with a portion of the chlorobenzene as an azeotrope. The product of Example 1 is obtained.

EXAMPLE 10

The procedure of Example 9 is repeated substituting 27 parts of lithium hydroxide hydrate for the 36 parts of potassium hydroxide. The product of Example 1 is obtained.

EXAMPLE 11

The procedure of Example 9 is repeated substituting 25 parts of sodium hydroxide for the 36 parts of potassium hydroxide. The product of Example 1 is obtained.

I claim:

1. A process for preparing a cationic triazole dye of the formula:

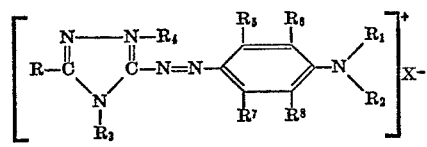

wherein R is a hydrogen, lower alkyl, cyclohexyl, phenyl, nitrophenyl, tolyl or thienyl; $R_1$ and $R_2$, individually are lower alkyl, beta-hydroxyethyl, beta-cyanoethyl, phenyl or benzyl and, when taken together with the nitrogen atom to which they are attached, form a morpholine ring; $R_3$ and $R_4$, individually, are lower alkyl; $R_5$, $R_6$, $R_7$ and $R_8$, individually, are hydrogen, chloro, lower alkyl, lower alkoxy or lower carboalkoxy; and $X^-$ is an anion; which comprises reacting a triazole dye base of the formula:

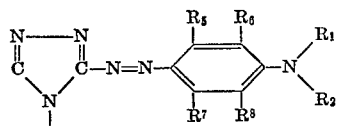

wherein R and $R_1$ through $R_8$ are as defined above; with a basic compound selected from an alkali metal hydroxide and an alkali metal alcoholate in the presence of an organic solvent to form an alkali metal salt of said dye base in said solvent, removing substantially all water present in the solvent solution, adding to said solution an alkylating and quaternizing agent selected from a di-lower alkyl sulfate, a lower alkyl halide and a lower alkyl ester of a mono-cyclic aryl sulfonic acid, maintaining the reaction mixture so formed at a temperature of from about 5° C. to about 60° C. for a period of from about 0.5 hour to about 4 hours, raising the temperature to from about 60° C. to about 85° C., maintaining the soution at this temperature level for a period of from about 5 hours to about 15 hours and recovering the cationic triazole dye product.

2. The process of claim 1 in which the triazole dye base is 3-(4-dimethylaminophenylazo)-1,2,4-triazole and the alkylating and quaternizing agent is dimethyl sulfate.

3. The process of claim 2 in which the basic compound reacted with the dye base is sodium methylate.

References Cited

UNITED STATES PATENTS 3,173,907   3/1965   Klingsberg et al. ---- 260—157

CHARLES B. PARKER, *Primary Examiner.*

DONALD M. PAPUGA, *Assistant Examiner.*